United States Patent [19]

Wayne et al.

[11] Patent Number: 4,498,179

[45] Date of Patent: Feb. 5, 1985

[54] MODULATED INFRARED LASER WITH TWO COUPLED CAVITIES

[75] Inventors: Robert J. Wayne, Berlin; Lanny M. Laughman, Bolton, both of Conn.; Robert J. Mongeon, East Longmeadow, Mass.; Peter P. Chenausky, Avon, Conn.

[73] Assignee: The Unites States of America as represented by the Secretary of the Army, Washington, D.C.

[21] Appl. No.: 403,439

[22] Filed: Jul. 30, 1982

[51] Int. Cl.³ .............................................. H01S 3/10
[52] U.S. Cl. ...................................... 372/27; 372/97; 372/106; 372/108
[58] Field of Search .................... 372/26, 27, 97, 106, 372/108

[56] References Cited

U.S. PATENT DOCUMENTS 3,918,007 11/1975 Waksberg .............................. 372/97

Primary Examiner—James W. Davie
Attorney, Agent, or Firm—Anthony T. Lane; Jeremiah G. Murray; Edward Goldberg

[57] ABSTRACT

The intracavity modulated laser includes a main cavity and an adjacent coupled cavity with a gain cell in the main cavity and an electro-optic modulator in the coupled cavity, the cavities being coupled in such a way that the energy level in the coupled cavity during laser operation is much lower than that in the main cavity, and whereby the modulator can selectively affect the polarization of energy in accordance with a voltage applied thereto to selectively couple energy out of both cavities in a desired manner.

3 Claims, 5 Drawing Figures

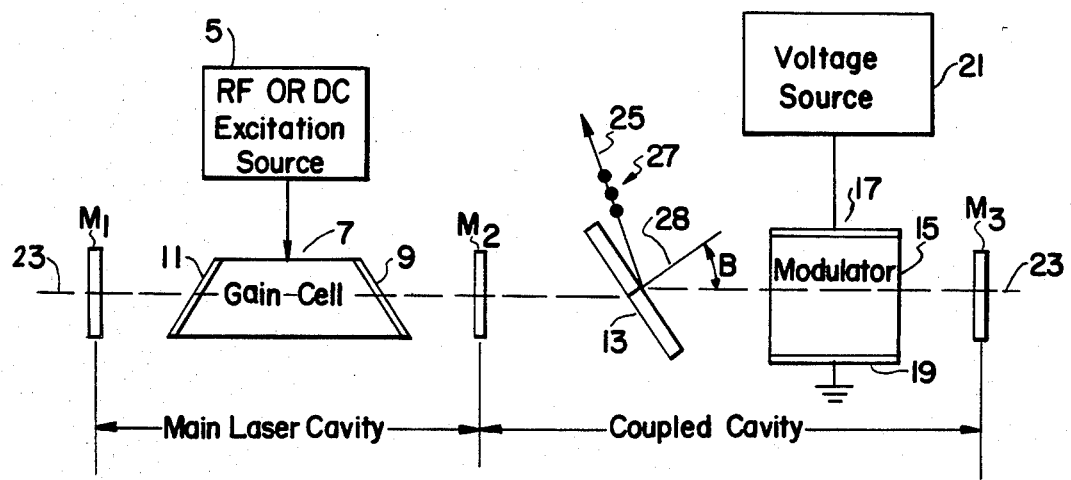
FIG. 1
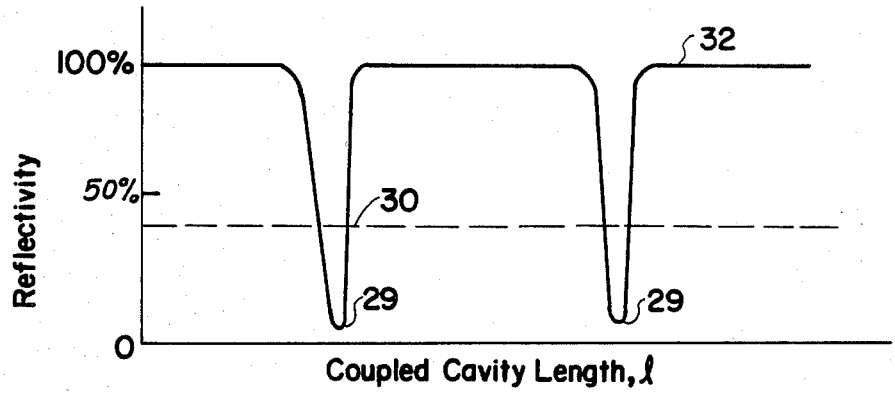
FIG. 2
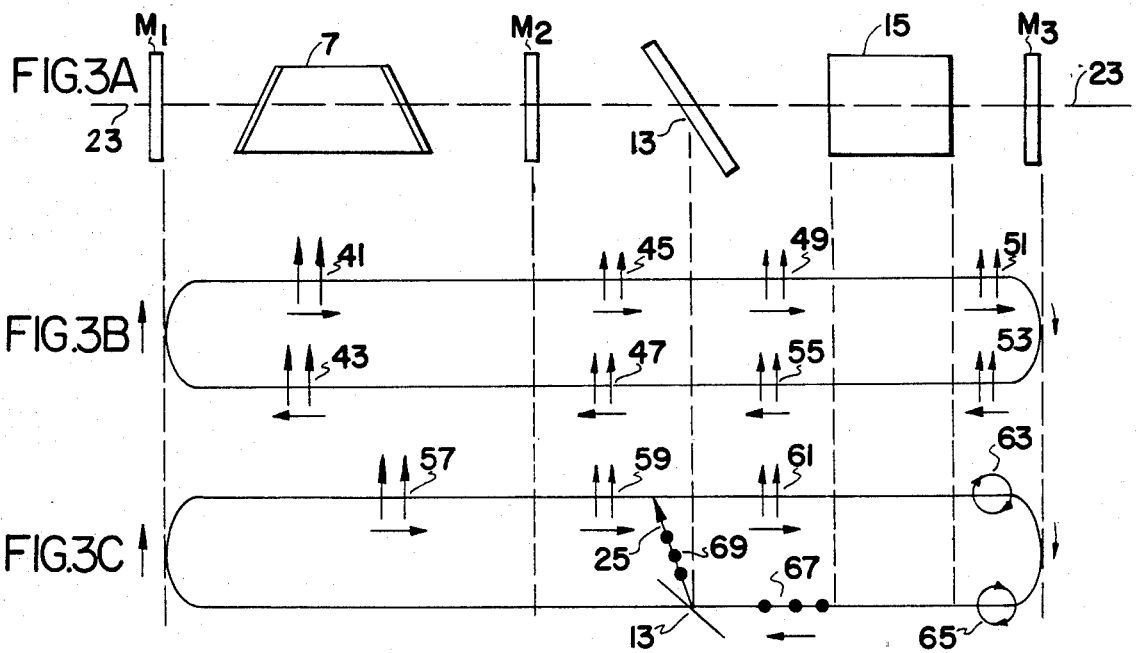

MODULATED INFRARED LASER WITH TWO COUPLED CAVITIES

The Government has rights in this invention pursuant to Contract DAAB07-76-C-0920, awarded by the Department of the Army.

BACKGROUND OF THE INVENTION

This invention relates to lasers, and more particularly to an improved gas laser which includes a pair of coupled laser cavities with a gaseous gain medium in one cavity and an active modulator in the coupled cavity, such that continuous wave (cw) energy as well as various forms of pulsed laser energy at different levels may be selectively coupled out of the coupled cavity through the action of the modulator.

Carbon dioxide lasers have been used in the past to produce IR energy in the 10 micron wavelengths region. The output of such lasers can be actively modulated by modulators which are either within the laser cavity or external thereto. Such techniques include acousto-optic modulation for extracavity frequency shifting and intracavity mode locking, electro-optic modulation for mode locking, Q-switching and cavity dumping, chirp modulation, Stark effect modulation for Q-switching and cavity dumping, and intracavity electro-optic modulation. An example of the latter technique is found in U.S. Pat. No. 4,176,327.

Intracavity electro-optic modulation offers the widest diversity in modulation formats for a modulated $CO_2$ laser transmitter, considering efficiency, modulation rate, power handling capacity, and modulation range. Also, the use of an intracavity modulator arranged to modulate the laser energy by changing the intracavity polarization or coupling is considered to offer the widest range of modulation formats. IR lasers with multiple modulation formats are extremely useful as laboratory signal sources and in such applications as multi-function laser radars. For example, an airborne laser radar may require widely different transmitted signals to perform such diverse functions as target acquisition, range contouring, range rate measurement, Doppler navigation, three dimensional imaging, etc.

Intracavity modulation is preferred over extracavity modulation because of the lower modulator voltages required to produce a given depth of modulation. Further, recent advances in solid state devices have made available extremely low loss cadmium telluride (CdTe) electro-optic modulators for the 10 micron region. Earlier modulators of this type have exhibited an insertion loss which made intracavity modulation impractical for many applications.

SUMMARY OF THE INVENTION

The novel laser of the present invention comprises a pair of coupled laser cavities. The main cavity comprises a gaseous laser gain medium or cell which for example may comprise $CO_2$ gas sealed in a section of waveguide with a suitable RF or DC excitation source connected thereto for producing the required population inversion. The gain medium is one which is capable of continuous wave (cw) operation. Transmission windows at either end of the gain cell comprise means to permit only laser energy linearly polarized in one direction to exit the cell. First and second mirrors at opposite ends of the gain cell define the boundaries of the first or main cavity. A second coupled cavity is located in series therewith along the same optical axis. The second or coupled cavity is defined by said second mirror and a third mirror. Thus the laser comprises three mirrors arranged along the same axis to define a pair of cavities which share the middle mirror. The second or coupled cavity comprises an electro-optical modulator which exhibits voltage variable birefringence and thus can selectively affect the polarization of laser energy passing therethrough. A polarization coupler is also contained in the second cavity and is arranged at its Brewster angle relative to the optical axis so that energy having a certain polarization, namely a polarization normal or orthogonal to that which exits the gain cell, will be coupled out of the laser by reflection from the polarization coupler. The two end mirrors, namely the first and third mirrors are highly reflective, while the middle or second mirror which connects the main and coupled cavities is made only partially reflective so that much of the non-reflected energy passes therethrough. The length of the coupled cavity is chosen so that the energy which passes through the second mirror into the coupled cavity is reflected from the third mirror and back through the second mirror in such a phase that it reinforces the laser energy reflected from the second mirror. This will occur if the coupled cavity is not an integral number of half wavelengths in length at the operating frequency.

As a result of this structure the energy levels in the coupled cavity are only a fraction of those in the main cavity, yet all or most of the energy in both cavities can be selectively controlled and coupled out by the action of the modulation system. The reduced power levels in the coupled cavity reduces problems associated with high power operation, for example, thermal lensing of the modulator crystal.

It is thus an object of the invention to provide a novel gas laser comprising a pair of coupled cavities with a gain cell in one cavity and an electro-optic modulator and a polarization coupler in the second coupled cavity, with the coupling between cavities arranged so that the energy level in the second coupled cavity during laser operation is much less than that of said one cavity, and whereby said electro-optic modulator can selectively affect the polarization of energy in said coupled cavity in accordance with the voltage applied thereto, whereby the energy coupled out of said laser may be varied and controlled in a desired manner.

Another object of the invention is to provide a novel dual cavity laser in which a main and a coupled cavity are arranged in series with a gaseous gain cell in said main cavity and a modulation system in said coupled cavity and wherein said cavities are connected by a reduced reflectivity mirror of such low reflectivity that said main cavity, if isolated, would be unable to sustain laser cw operation, and whereby said coupled cavity is tuned to a resonant length such that laser oscillation can be sustained in both cavities if the laser energy coupled out of said coupled cavity is below a certain threshold, whereby the energy level in said coupled cavity will be substantially lower than that in said main cavity.

A further object of the invention is to provide a laser which includes an intracavity active modulator for controlling the output thereof and which modulator operates in an auxiliary cavity which is coupled to the main laser cavity in such a way that the energy level in said auxiliary cavity is much less than that of said main cavity and wherein all of the energy in both cavities can be selectively coupled out of said laser by the action of said modulator.

A still further object is to provide a laser with an intracavity modulator which operates in a low energy level cavity but which is capable of controlling higher laser energy from an adjacent laser cavity.

These and other objects and advantages of the invention will become apparent from the following detailed description and the drawings.

BRIEF DESCRIPTION OF THE DRAWINGS

FIG. 1 is a schematic diagram of the laser of the present invention.

FIG. 2 is a graph showing how the length of the coupled cavity of the laser of FIG. 1 is selected.

FIGS. 3A, 3B, and 3C show how the modulation system can affect the polarization of the laser energy to selectively couple out energy of different desired characteristics.

DETAILED DESCRIPTION OF A PREFERRED EMBODIMENT

A schematic diagram illustrating the principles of operation of the novel laser is shown in FIG. 1. The two resonant cavities comprising this laser are the main cavity and the coupled cavity, so labelled and arranged in series along the same optical axis 23. The main cavity comprises the space between the highly reflective mirror $M_1$ and the low reflectivity mirror $M_2$. The mirror $M_2$ for example may be a half silvered mirror which has an intrinsic reflectivity of from 10 to 40 percent for energy of the wavelength in question arriving from the left in FIG. 1. The coupled cavity comprises the space between the mirrors $M_2$ and $M_3$, $M_3$ being highly reflective like $M_1$.

The gain cell 7 comprises a sealed section of waveguide with a lasing gas therein, for example $CO_2$. The RF or DC excitation source 5 is connected to the gain cell to provide population inversion which will permit continuous wave operation of the laser, provided that output coupling due to the modulator action leaves sufficient optical flux circulating through both cavities to sustain such cw operation. The windows 9 and 11 of the gain cell permit the optical flux produced therein to exit. These windows are designed to be highly transparent at the operating wavelength and are also designed to permit only linearly polarized optical flux to exit. This can be done by arranging the transmission windows 9 and 11 at their Brewster angles relative to the optical axis 23. Other polarizing type windows can be used, for example stressed glass which need not be angled as are the windows shown. As a result of this polarization selection, all of the optical flux leaving the gain cell will be vertically polarized with its electric vector vertical or parallel to the plane of the paper in the side view of FIG. 1.

The coupled cavity comprises an electro-optical modulator 15 with a voltage source 21 for controlling the operation thereof, and a polarization coupler 13 angularly disposed at its Brewster angle, B, to the optical axis. The line 28 is perpendicular to the broad surface of the coupler 13. The electro-optical modulator is preferably a low loss cadmium telluride crystal of the type mentioned above, and may be AR coated. The polarization coupler 13 may be a gallium arsenide plate or equivalent high refractive index material. The voltage from source 21 is applied to electrodes 17 and 19 on either side of modulator crystal 15.

Intracavity modulators of this type exhibit a voltage dependent birefringence which means that there are two different indices of refraction in different directions within the crystal. Further the difference between the two indices, called the ordinary and the extraordinary indices, depends on the applied voltage. An incident plane polarized wave can be applied to such a crystal in such a way that equal components thereof propagate along the ordinary and extraordinary axes thereof, and thus one component can be variably retarded with respect to the other. By adjusting the applied voltage so that this retardation is 90°, the crystal will function as a quarter wave plate which is capable of converting linearly polarized energy to circularly polarized energy, or vice versa, after a single pass through the crystal. At voltages other than this so-called quarter wave voltage other relative retardation angles will result which can convert linearly polarized crystal inputs to elliptically polarized outputs, and vice versa. Thus a modulator of this type with quarter wave voltage applied thereto and mounted as shown in FIG. 1 will convert the vertical linearly polarized optical flux incident thereon from the main cavity to circular polarized flux which is then reflected from $M_3$ and on its return through the modulator travelling toward the left in FIG. 1, it will be converted into linearly polarized flux but orthogonal to the original polarization so that it is now horizontally polarized. This orthogonally polarized flux upon striking the polarization coupler 13 will be coupled out of the cavity along the arrow 25. The dots or small circles 27 indicate the outgoing horizontally polarized output. Vertically polarized flux, for instance that emitted by gain cell 7, will pass through the polarization coupler in either direction with no loss and possibly only a slight offset of the optical axis 23 on either side of this element, caused by refraction. Thus if the modulator voltage is zero, the polarization throughout both cavities will remain the same as that emitted by the gain cell and the flux will circulate within the cavities.

In accordance with the invention, the intrinsic reflectivity of mirror $M_2$ is made low enough so that the main cavity, if isolated, would not be capable of sustained cw operation since the energy loss through $M_2$ plus the internal losses would exceed the rate of energy generation in gain cell 7. Thus in order to sustain cw operation, the coupled cavity must be designed to increase the effective reflectivity of $M_2$. This can be done if the laser energy which passes through $M_2$ into the coupled cavity and is reflected back to $M_2$ from mirror $M_3$ arrives at the reflective surface of $M_2$ in such a phase as to reinforce the portion of the output of the gain cell which is directly reflected from $M_2$. This will occur if the coupled cavity round trip length is made a half integral number of wavelengths long. If the combination of the losses in the coupled cavity and the amount of flux being coupled therefrom via action of the modulation system, are below a certain threshold, the effective reflectivity of $M_2$ will be high enough to sustain cw operation of both cavities. In such a cw mode, the majority of the optical flux will be confined to the main cavity. For example, if $M_2$ has an intrinsic reflectivity of 10% and an effective reflectivity of 95% (based on an assumed 10% round trip modulator loss) due to the tuning of the coupled cavity, the ratio of flux incident of $M_3$ (in the coupled cavity) relative to that incident on $M_2$ is 0.53. It has been found that this principle works well if the intrinsic reflectivity of $M_2$ is in the range of 10–40%.

The graph of FIG. 2 shows how the effective reflectivity of $M_2$, as seen by the main cavity, varies with the coupled cavity length, l. The dashed line 30 represents the intrinsic reflectivity of $M_2$ which is seen to be less than 50%. The effective reflectivity, shown by the solid line curve 32, varies above and below this intrinsic value as the coupled cavity length varies. The resonant points 29 represent round trip cavity lengths which are integral multiples of one wavelength of the optical energy wavelength. It can be seen that the cavity length tuning is not critical in that the effective reflectivity remains high and flat over a majority of the curve 32 of FIG. 2.

The wavelength of course in the coupled cavity is not uniform because the flux passes through the crystal materials of the modulator and the polarization coupler in which the indices of refraction are considerably more than unity and not the same. Thus there are three wavelengths in the coupled cavity, that in the air space thereof, in the polarization coupler, and in the modulator, however this does not invalidate the rule stated above that the coupled cavity round trip length be a half integral number of wavelengths long. As a practical matter the coupled cavity would be adjusted in length by trial and error or with a feedback control system with the laser operating until one of the resonant lengths is found.

FIG. 3A shows a simplified schematic of the laser of FIG. 1 with the major components thereof indicated by the same reference characters. The diagrams of FIGS. 3B and 3C show the polarization state of the optical flux in the two cavities with different voltages applied to modulator 15 from voltage source 21. FIG. 3B shows the situation wherein the modulator voltage is zero, and hence the modulator crystal exhibits no birefringence and thus only slows the optical flux which passes therethrough without affecting the polarization thereof. FIGS. 3B and 3C show the optical flux travelling around a loop in a clockwise direction so that the flux travelling in each direction is indicated. In the case of FIG. 3B the flux is all vertically polarized as indicated by the vertical arrows 41, 43, 45, 49, 51, 53, 55, and 47. The horizontal arrows adjacent these reference numerals indicate the direction of propagation. The vertically polarized flux is a result of the aforementioned selection of this polarization by the transmission windows of the gain cell. As the flux 41 passes into the coupled cavity it will decrease in amplitude, as explained, but will be unchanged in polarization, as indicated by vertical arrows 45. The flux passes through polarization coupler 13 and modulator 15 with only a slight delay plus a slight attenuation, plus the slight offset of its path due to refraction in the polarization coupler and emerges from the modulator as flux 51. After reflection from $M_3$ the flux 53 again passes through the modulator and polarization coupler in the opposite direction to emerge from the polarization coupler as flux 47 after which it reenters the main cavity as flux 43, which is enhanced in amplitude because it includes the flux which circulates within the main cavity as well as that reentering from the coupled cavity. Thus for this no voltage condition, the laser cw oscillates with all the energy circulating within its cavities and with none coupled out.

In FIG. 3C is shown the situation wherein the modulator has the so-called quarter wave voltage applied thereto from voltage source 21 and thus functions as a quarter wave plate as previously described, in which the difference in the two indices of refraction therein are such that the ordinary and extraordinary waves passing therethrough experience a 90° phase difference in traversing the modulator crystal. For such a condition linearly polarized flux entering the modulator will be converted to circular polarization and vice versa. Thus the flux 57 generated in the main cavity will pass through $M_2$ to emerge as flux 59 in the coupled cavity and through polarization coupler 13 to emerge as flux 61 unchanged in polarization, as in the example of FIG. 3B. The flux 63 emerging from modulator 15 is circularly polarized, as indicated by the circle 63 with the arrowheads thereon. The flux is then reflected from mirror $M_3$ and reenters the modulator as flux 65, also circularly polarized, but as a result of its reflection it now is circularly polarized in the opposite sense, that is, if the flux 63 is right hand circularly polarized, the reflected flux 65 would be left hand circularly polarized. Upon re-passing through the modulator travelling to the left, the flux is converted into linearly polarized flux 67, but with an orthogonal or horizontal polarization. The dots or circles 67 indicate horizontal electric vectors normal to the plane of the paper. Since these vectors strike the polarization coupler parallel to its broad face and since the coupler is at its Brewster angle, as explained, most of this flux will be reflected out of the cavity in the direction of the arrow 25 as flux 69. Since very little of the energy is reflected back toward $M_2$ to increase the effective reflectivity thereof, laser oscillation will cease after all of the stored flux of both cavities has been coupled out.

At intermediate modulator voltages between zero and the quarter wave voltage, the modulator will convert the linear polarized flux to elliptically polarization, the same sense of rotation change will occur on reflection from $M_3$, and as a result of its second pass through the modulator, the elliptically polarized wave will be converted into a mixture of linearly polarized horizontal and vertical flux. The horizontal portions of the flux will be coupled out as explained in connection with FIG. 3C, while the vertically polarized portions will recirculate as does the flux in FIG. 3B. If this recirculating flux is of sufficient magnitude, it will sustain cw operation of the laser. This will occur if the recirculating flux increases the effective reflectivity of $M_2$ sufficiently to permit cw oscillation.

One of the major advantages of the dual cavity laser of this invention is that the modulator and polarization coupler both operate at reduced power levels and yet provide all of the advantages and versatility of intracavity modulation. High power levels in electro-optic modulators of this type cause a condition known as thermal lensing in which absorption of the high energy flux in the crystal causes undesired changes in the indices of refraction which degrade performance. The reduced power levels of both crystals of the invention eliminates these problems. It is true that the reduced power level in the coupled cavity causes a slight delay in coupling out energy, but this delay is only of the order of nano-seconds, which is the time required for the stored energy in both cavities to make a few round trips through both cavities.

The laser of this invention can be modulated in numerous ways to produce cw outputs of different amplitudes and durations, Q-switching with cavity dumping at the peak of Q-switch power, or Q-switching followed by a reduced cw output of controllable duration, shaped optical pulses resulting in a fast rising Q-switch with variable pulse widths controlled by the pulse shape applied to the modulator. Different forms of modulation may be applied to both cw and pulsed outputs. Also, Q-switching and cavity dumping may be combined with mode locking techniques.

While the invention has been described in connection with illustrative embodiments, variations therein will occur to those skilled in the art without the exercise of invention, accordingly the invention should be limited only by the scope of the appended claims.

We claim:

1. A gas laser comprising:
   a main resonant cavity including a gain cell positioned along an optical axis, a source of excitation coupled to said cell, a pair of windows at opposite ends of said gain cell providing an output of vertically polarized optical energy;
   a coupled cavity axially aligned with said main cavity and including a polarization coupler angularly disposed at its Brewster angle to said axis for coupling energy out of said laser having a polarization normal to that from said gain cell, an electro-optic modulator spaced from said coupler in said coupled cavity along said axis for controlling the polarization of energy passing therethrough, a source of control voltage coupled to said modulator; and
   a plurality of mirrors including first and second highly reflective end mirrors positioned at the respective opposite ends of said main and coupled cavities and a third low reflectivity mirror positioned between said cavities, the reflection of energy between said coupled cavity end mirror and third mirror being of a phase to reinforce output of said gain cell in order to sustain continuous wave operation.

2. The gas laser of claim 1 wherein said control voltage coupled to said modulator selectively controls the polarization of optical energy passing through said modulator and returned to and reflected out by said polarization coupler.

3. The laser of claim 1 wherein the round trip length of said coupled cavity is selected as a half integral number of wavelengths of the laser operating frequency.

* * * * *